United States Patent
Grimke

(10) Patent No.: US 6,726,366 B2
(45) Date of Patent: Apr. 27, 2004

(54) SPINDLE BEARING

(75) Inventor: Dirk Grimke, Wahrenholz (DE)

(73) Assignee: Valeo Klimasysteme GmbH, Rodach (DE)

( * ) Notice: Subject to any disclaimer, the term of this patent is extended or adjusted under 35 U.S.C. 154(b) by 0 days.

(21) Appl. No.: 10/051,303

(22) Filed: Jan. 22, 2002

(65) Prior Publication Data

US 2002/0102038 A1 Aug. 1, 2002

(30) Foreign Application Priority Data

Jan. 25, 2001 (DE) .......................... 101 03 351

(51) Int. Cl.[7] .............................. F16C 17/02
(52) U.S. Cl. ..................... 384/129; 384/905.1
(58) Field of Search .............. 384/461, 901, 384/129, 276, 905.1

(56) References Cited

U.S. PATENT DOCUMENTS 5,618,107 A * 4/1997 Bartsch ................ 384/276
5,788,381 A * 8/1998 Yamazaki et al. ......... 384/400

FOREIGN PATENT DOCUMENTS

| DE | 38 18 565 A1 | 12/1989 |
| DE | 40 06 041 A1 | 8/1991 |
| DE | 197 01 499 C1 | 12/1997 |

* cited by examiner

Primary Examiner—Lenard A. Footland
(74) Attorney, Agent, or Firm—Ronald Courtney

(57) ABSTRACT

Spindle bearing for essentially parallel spindles, in particular of air flaps in a vehicle heating, ventilating and/or air conditioning unit, having respective bearing bushes, the bearing bushes at least partially overlapping in the axial direction.

11 Claims, 3 Drawing Sheets

SPINDLE BEARING

BACKGROUND OF THE INVENTION

The present invention relates generally to a spindle bearing for essentially parallel spindles and more specifically to spindle bearings for essentially parallel spindles of air flaps in a vehicle heating, ventilating and/or air conditioning unit.

DESCRIPTION OF THE PRIOR ART

In the case of many applications, for example in a two- or multi-zone air conditioning system, corresponding ducts for particular zones are formed in an air-conducting housing, said ducts being separated from one another by means of dividing walls. In order to make it possible to adjust the air throughput, the mixture ratio of fresh air to warm air or other aerothermic parameters, an air flap is conventionally provided in each duct formed in this manner, said air flap being articulated in its end regions on a wall or intermediate wall of the air-conducting housing.

A known spindle bearing of this type, as is currently being used in-house by the applicant, is illustrated in FIG. 1. As can be seen, bearing devices 40, 50 which can be used as bushes for particular spindles 20, 30 are provided on both sides of a dividing wall 10 of an air-conducting housing (not illustrated). Particularly in the case where, as illustrated, the spindles are virtually aligned with each other, there is the problem that the engagement between the bearing device 50 and spindle 30, on the one hand, and bearing device 40 and spindle 20, on the other hand, is either very small or the projection of the bearing device requires too much structural space, which has the consequence that either the air flap mounted on the spindles has a complex shape or else that the clear cross section is reduced.

SUMMARY OF THE INVENTION

The object of the present invention is therefore to develop a known spindle bearing for essentially parallel spindles, in particular of air flaps in a vehicle heating, ventilating and/or air conditioning unit, having respective bearing bushes in such a manner that an improved bearing arrangement and/or a more compact configuration is made possible.

According to the invention, this object is achieved by a spindle bearing having the features of claim 1. Preferred embodiments are defined in the dependent claims.

In particular, the invention proposes a spindle bearing for essentially parallel spindles, in particular of air flaps in a vehicle heating, ventilating and/or air conditioning unit, having respective bearing bushes, in which the bearing bushes at least partially overlap in the axial direction. In other words, the space formed by one bearing bush can be used to accommodate the other bearing bush, in order thus to increase the supporting surface for a mounted spindle and/or in order to reduce the required structural space, in particular the size of a dividing wall, in the region of the spindle bearing. It should be understood that the at least partial overlap of the bearing bushes does not absolutely have to correspond to a corresponding overlap of the respective engagement with spindle sections. On the contrary, it would also be conceivable for the bearing engagement of the left spindle to occur further to the right than the corresponding engagement of the right spindle. It should also be understood that in order to support the bearing arrangement, means may additionally be provided, which means essentially fulfill the function of a known bearing arrangement.

The solution according to the invention also has the advantage that the installation process is improved, specifically irrespective of whether installation is begun with the one or other spindle, since the spindles can in each case enter deep into the dividing wall. The risk, which usually exists on account of the spindles being inclined, of installation being undertaken wrongly is therefore considerably reduced.

The bearing bushes are advantageously designed essentially coaxially with one another. It is therefore possible, for example, to mount a first air flap by means of its spindle in the dividing wall while a further flap is mounted in the first flap, in particular in the spindle end section.

The end sections of the spindles may be of integral design or else have corresponding engagement devices, it being preferred in each case for it to be possible for the spindles to be essentially aligned with each other after installation.

As an alternative to a coaxial design, the solution according to the invention can likewise be used in order to mount two spindles eccentrically and essentially parallel to each other. This would have the result that instead of the otherwise independent activation of the two air flaps, there is a certain interaction.

In the case of one preferred embodiment, one of the bearing bushes is formed in the bearing engagement section of the other spindle/air flap.

A part forming a bearing bush is advantageously at the same time a bearing journal. It should be mentioned in this connection that the bearing arrangement can also be undertaken by means of a number of bearing bushes for one and the same spindle. For example, it would be possible to mount a spindle both with regard to the dividing wall and also within the end section of the other spindle.

In order to permit a defined installation process and/or a retaining of the position after the installation of the individual air flaps and/or the associated spindles, a device restricting the axial movement is advantageously provided on at least one spindle, in particular on each spindle.

It is also preferred for at least one sealing device to be provided, which sealing device can, on the one hand, prevent the ingress of contaminants into the bearing region and, on the other hand, can prevent air from passing through the dividing wall. In the case of a particularly preferred embodiment, each spindle end has a sealing device injection-moulded onto it. In addition to the sealing function, a sealing device can also assist in restricting the axial movement or can take it on by itself, it also being possible for there to be a snap-in function in order to indicate, for example to the person undertaking the installation, that the respective spindles have been correctly installed.

In order to simplify the introduction of one spindle end into the corresponding bearing bush, a bevel is advantageously formed on at least one spindle end or bearing part.

Finally, it is preferred for the bearing bushes to overlap by at least the thickness of an intermediate wall, in particular by at least 4 mm.

DESCRIPTION OF THE DRAWINGS

Further advantages and features of the present invention also result from the following description, which is given merely by way of example, of currently preferred embodiments, said description being undertaken with reference to the attached drawings in which.

DESCRIPTION OF THE PREFERRED EMBODIMENTS

Figure 1:
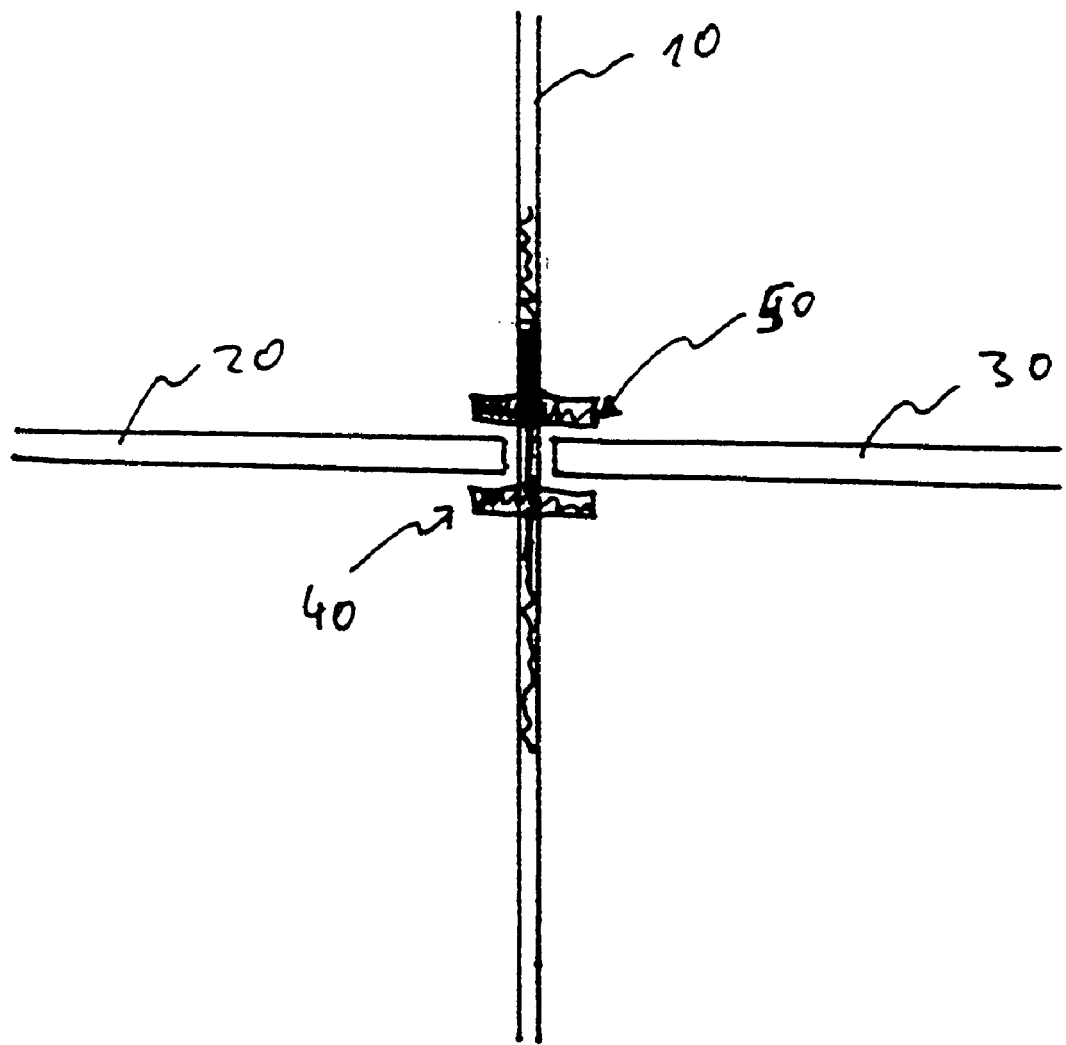
FIG. 1 shows a spindle bearing arrangement according to the prior art.

As is illustrated in FIG. 1, two spindles 20, 30 have frequently to be articulated with respect to an intermediate wall 10, this having been hitherto achieved by the formation of bearing bushes on both sides.

Figure 2:
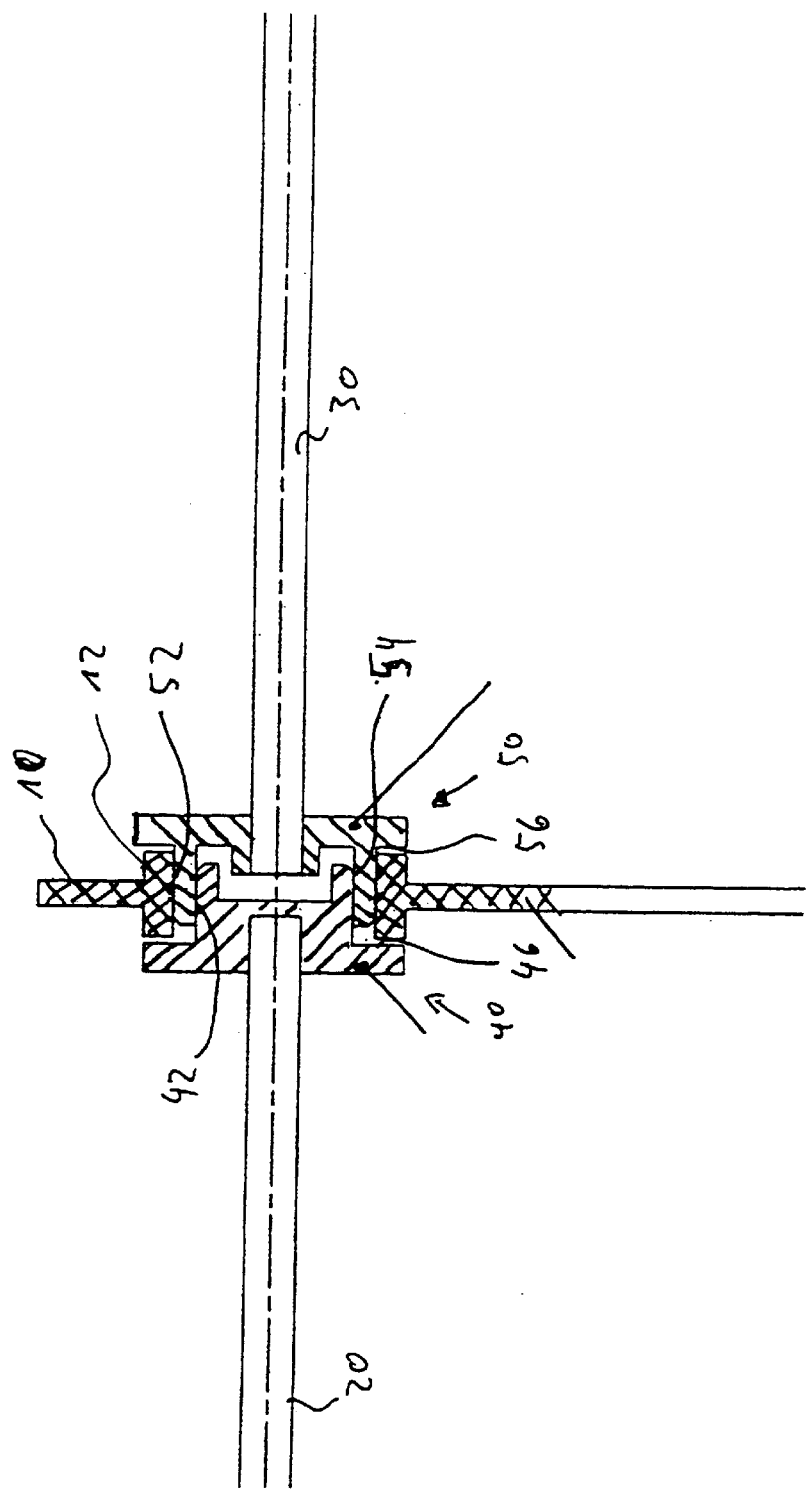
FIG. 2 shows a first preferred embodiment of a Spindle bearing as claimed in the invention.

The embodiment shown in FIG. 2 is likewise concerned with mounting spindles 20, 30 together with associated air flaps (not illustrated) with respect to an intermediate wall 10, the intention being to reduce the structural space requirements and/or to increase the supporting surfaces. The intermediate wall 10 defines a bearing surface 12, in which an end section of the spindle 30 can engage. For this purpose, a separate bearing bush 50 or else the air flap itself can form a hollow bearing journal, which is in engagement with the bearing surface 12 via a bearing bush surface 52 of the bearing bush 50. Opposite the bearing bush surface 52, the bearing bush 50 forms a cavity, which defines a bearing bush surface 54. The two bearing surfaces 12 and 54 therefore overlap by at least a thickness of the intermediate wall 10.

Situated within the bearing bush surface 54 is a bearing bush 40 of the other spindle 20, which can be of integral design with the spindle 20, can be present as a separate part or else can be part of the air flap itself. As illustrated in FIG. 2, the bearing bushes 40 and 50 directly engage each other and at least partially overlap in the axial direction. A bearing bush surface 42 of the bearing bush 40 therefore forms a bearing journal which can interact with the bearing bush surface 54.

In order to limit the axial movements of the spindles 20 and 30, respective bearing surfaces 46, 56 are provided on the bearing bushes 40 and 50 respectively, which can interact with side surfaces of the bearing surface 12 of the intermediate wall 10. As illustrated, the respectively distal ends of the spindles or of engagement sections of the bearing bushes 40 and 50 are of beveled design in order to simplify the respective insertion.

Figure 3:
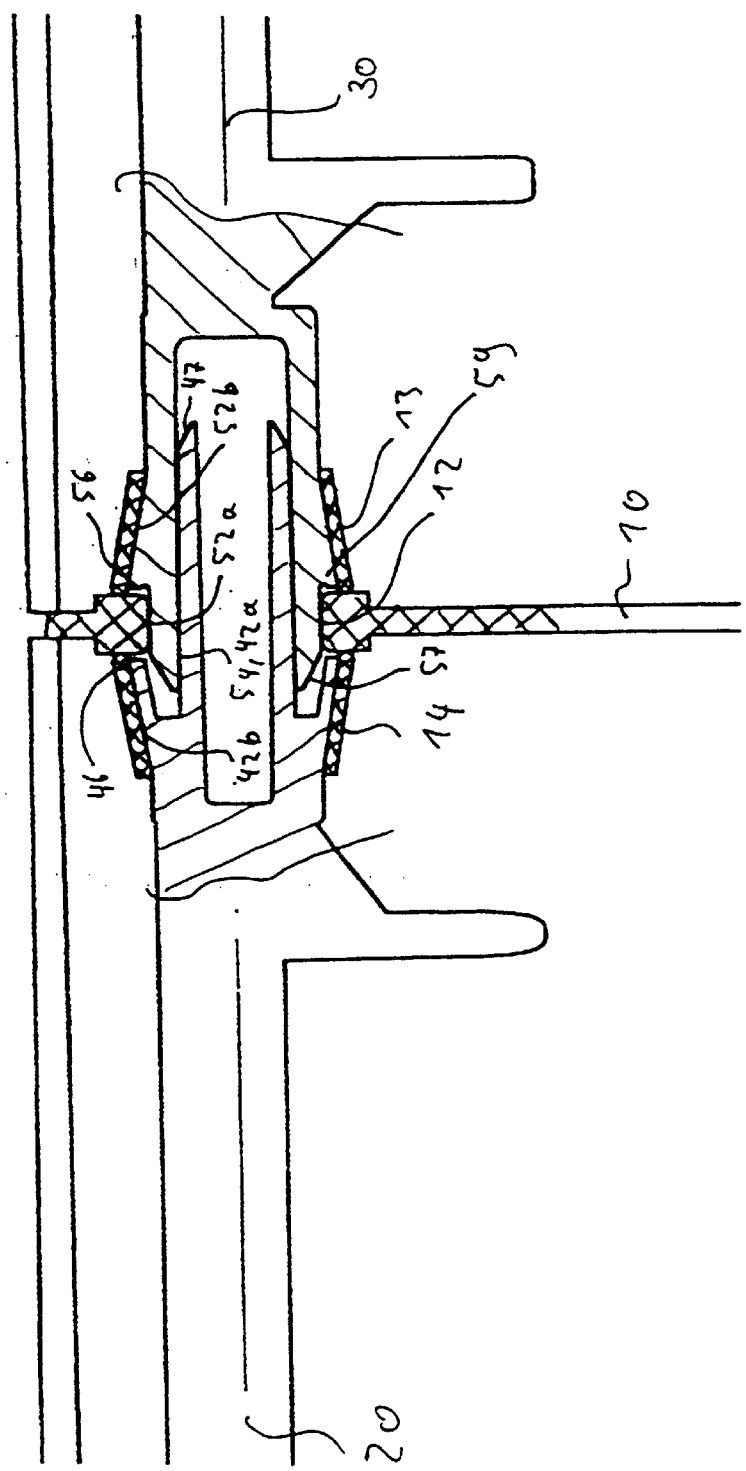
FIG. 3 shows a further preferred embodiment of a Spindle bearing as claimed in the invention.

FIG. 3 illustrates a further preferred embodiment of a spindle bearing arrangement according to the invention. In the same manner of the embodiment illustrated in FIG. 2, this embodiment concerns mounting two spindles 20, 30 with respect to an intermediate wall 10. In the case of the embodiment shown in FIG. 3, the bearing arrangement is substantially improved by the fact that a relatively thick overlap region is provided between the bearing bushes.

The intermediate wall 10 in turn forms a bearing bush surface 12, with which a part of the right spindle 30 can interact, via an engagement surface 52a. In the embodiment illustrated, sealing devices 13, 14 are likewise illustrated on both sides of the intermediate wall 10, which sealing devices ensure, on the one hand, that no contaminants can enter the bearing region and, on the other hand, ensure that no leakage of air is possible. In the embodiment illustrated, the sealing devices 13, 14 are firmly connected to the spindle ends, for example by means of injection molding, with the result that the distal end sections of the sealing devices 13, 14 bear against the intermediate wall and can therefore restrict the axial movement of the spindles. As an alternative, it would also be possible to fasten the sealing devices 13, 14 to the intermediate wall 10, instead of to the respective spindles, which would enable a corresponding snap-in function to take place. In this case, the engagement of the sealing device 14 with the surface 42b could align and support the left spindle 20 and the engagement of the sealing device 13 with the surface 52b could align and support the right spindle 30, specifically also without the correspondingly other bearing device being present in each case.

A cavity which defines a bearing bush surface 54 within it is formed in the right spindle 30. The end section of the other spindle 20 can be inserted into this bearing bush, the surface section 42a acting in the manner of a bearing journal. The spindle 20 is therefore mounted within the spindle 30, a respective bearing surface 56 and 46 being formed both for the spindle 30 and the spindle 20, in order to be able to restrict the axial movement.

In addition to the clear overlap, the embodiment shown in FIG. 3 is distinguished in that the installation sequence is as desired, since both bearing ends enter to a substantial extent through the wall 10, air being effectively prevented from passing through, by means of the sealing devices.

Although the present invention has been described above entirely with reference to currently preferred embodiments, it should be understood by the expert that a very wide variety of modifications are possible within the framework of the claims. In particular, individual features of one embodiment may be combined as desired with features of another embodiment.

What is claimed is:

1. Spindle bearing for supporting at least two substantially parallel spindles of air flaps in a vehicle heating, ventilating and/or air conditioning unit, the spindle bearing having at least two respective bearing bushes each supporting a corresponding one of the at least two spindles, wherein the bearing bushes directly engage each other and at least partially overlap in an axial direction.

2. Spindle bearing as claimed in claim 1, wherein the bearing bushes are positioned coaxially.

3. Spindle bearing as claimed in claim 1, wherein the spindles are substantially aligned.

4. Spindle bearing as claimed in claim 1, wherein the spindles are present eccentrically.

5. Spindle bearing as claimed in claim 1, wherein one of the at least two bearing bushes is formed within a bearing bush of the other of the at least two bearing bushes.

6. Spindle bearing as claimed in claim 1, wherein a part forming a bearing bush is at the same time a bearing journal.

7. Spindle bearing as claimed in claim 1, wherein a device restricting the axial movement of the spindles is provided on at least one of the at least two bearing bushes.

8. Spindle bearing as claimed in claim 1, wherein at least one sealing device is provided.

9. Spindle bearing as claimed in claim 1, wherein at least one spindle end, in particular each spindle end, has at least one bevel.

10. Spindle bearing for supporting at least two substantially parallel spindles of air flaps in a vehicle heating, ventilating and/or air conditioning unit, the spindle bearing having at least two respective bearing bushes each supporting a corresponding one of the at least two spindles, wherein the bearing bushes directly engage each other and at least partially overlap in an axial direction;

wherein the bearing bushes overlap by at least a thickness of an intermediate wall.

11. The spindle bearing as claimed in claim 10, wherein the bearing bushes overlap by at least 4 mm.

* * * * *